(12) United States Patent  (10) Patent No.: US 9,391,445 B2
Sun et al.  (45) Date of Patent: Jul. 12, 2016

(54) SURGE PROTECTION CIRCUIT, SWITCHING POWER SUPPLY, AND SURGE PROTECTION METHOD

(71) Applicant: Huawei Device Co., Ltd., Shenzhen (CN)

(72) Inventors: Liangang Sun, Shenzhen (CN); Wei Di, Shanghai (CN); Mei Zou, Shenzhen (CN); Yiyong Pu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 223 days.

(21) Appl. No.: 14/331,622

(22) Filed: Jul. 15, 2014

(65) Prior Publication Data

US 2014/0334043 A1  Nov. 13, 2014

Related U.S. Application Data

(63) Continuation of application No. PCT/CN2013/073586, filed on Apr. 1, 2013.

(30) Foreign Application Priority Data

Apr. 1, 2012 (CN) .......................... 2012 1 0096080

(51) Int. Cl.
*H02H 1/00* (2006.01)
*H02H 7/12* (2006.01)
(Continued)

(52) U.S. Cl.
CPC . *H02H 7/12* (2013.01); *H02H 9/06* (2013.01); *H01F 27/343* (2013.01); *H02G 13/80* (2013.01); *H02H 3/20* (2013.01); *H02H 7/04* (2013.01); *H05B 41/2851* (2013.01)

(58) Field of Classification Search
USPC .......................................... 361/8, 18, 35, 120
See application file for complete search history.

(56) References Cited

U.S. PATENT DOCUMENTS

| 5,892,669 A | 4/1999 | Shin | |
| 7,535,685 B2 * | 5/2009 | Sandahl | H04B 3/56 361/38 |
| 2004/0252436 A1 * | 12/2004 | Kucharski | H04M 3/18 361/119 |

FOREIGN PATENT DOCUMENTS

| CN | 1184355 A | 9/1998 |
| CN | 1753129 A | 3/2006 |

(Continued)

OTHER PUBLICATIONS

Foreign Communication From A Counterpart Application, European Application No. 13773092.5, Extended European Search Report dated Dec. 17, 2014, 5 pages.

(Continued)

*Primary Examiner* — Danny Nguyen
(74) *Attorney, Agent, or Firm* — Conley Rose, P.C.; Grant Rodolph; Nicholas K. Beaulieu

(57) ABSTRACT

A surge protection circuit, a switching power supply, and a surge protection method are provided that can prevent a power supply from being damaged by a high energy surge voltage discharged from a terminal device to an output end of a power supply. The surge protection circuit is applied to the switching power supply. The power supply includes a transformer. The circuit includes a surge protection tube. When a surge voltage on the terminal device is greater than a discharge voltage of the surge protection tube, the surge protection tube is conducted and discharges the surge voltage on the terminal device to the ground wire end at the high voltage side of the transformer. The embodiments of the present invention are applicable to the field of electronic technologies.

10 Claims, 3 Drawing Sheets

(51) Int. Cl.
*H02H 9/06* (2006.01)
*H02G 13/00* (2006.01)
*H05B 41/285* (2006.01)
*H02H 3/20* (2006.01)
*H01F 27/34* (2006.01)
*H02H 7/04* (2006.01)

(56) References Cited

FOREIGN PATENT DOCUMENTS

| | | | |
|---|---|---|---|
| CN | 2930191 | Y | 8/2007 |
| CN | 201278411 | Y | 7/2009 |
| CN | 201440607 | U | 4/2010 |
| CN | 101719665 | A | 6/2010 |
| CN | 201589156 | U | 9/2010 |
| CN | 102110980 | A | 6/2011 |
| CN | 202076780 | U | 12/2011 |
| CN | 202111470 | U | 1/2012 |
| GB | 2342516 | A | 4/2000 |
| JP | 1028322 | A | 1/1998 |

OTHER PUBLICATIONS

Foreign Communication From A Counterpart Application, Chinese Application No. 20120096080.6, Chinese Office Action dated Feb. 27, 2015, 6 pages.
Partial English Translation and Abstract of Chinese Patent Application No. CN2930191, Dec. 8, 2015, 9 pages.
Foreign Communication From A Counterpart Application, Chinese Application No. 201210096080.6, Chinese Office Action dated Oct. 29, 2015, 6 pages.
Partial English Translation and Abstract of Chinese Patent Application No. CN1753129A, Sep. 23, 2014, 26 pages.
Partial English Translation and Abstract of Chinese Patent Application No. CN102110980A, Sep. 23, 2014, 5 pages.
Foreign Communication From a Counterpart Application, PCT Application No. PCT Application No. PCT/CN2013/073586, English Translation of International Search Report dated Jul. 4, 2013, 2 pages.
Foreign Communication From a Counterpart Application, PCT Application No. PCT Application No. PCT/CN2013/073586, English Translation of Written Opinion dated Jul. 4, 2013, 9 pages.

\* cited by examiner

SURGE PROTECTION CIRCUIT, SWITCHING POWER SUPPLY, AND SURGE PROTECTION METHOD

CROSS-REFERENCE TO RELATED APPLICATIONS

This application is a continuation of International Application No. PCT/CN2013/073586, filed on Apr. 1, 2013, which claims priority to Chinese Patent Application No. 201210096080.6, filed on Apr. 1, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of electronic technologies, and in particular, to a surge protection circuit, a switching power supply, and a surge protection method.

BACKGROUND

When an electronic circuit is struck by lightning, and when it is connected to or disconnected from an inductive load or a large load, generally, a very high transient overvoltage is generated, and such a transient overvoltage is called a surge voltage, which is interference to the electronic circuit. In an existing surge protection design in the power supply industry, after the mains is connected, a surge protection circuit is designed at a high voltage side of a transformer so as to prevent a surge voltage from damaging a power supply.

Generally, a power supply includes a transformer, where a high voltage side of the transformer is an input end of the power supply, and a low voltage side of the transformer is an output end of the power supply.

As a result, a common power supply withstands a surge voltage by using a surge protection circuit at the high voltage side of the transformer, while the low voltage side is not protected by a surge protection circuit. When a surge voltage is generated on a terminal device, the terminal device discharges the surge voltage to a ground wire end at the low voltage side of the transformer through a protection component of the terminal device, so as to suppress the surge voltage on the terminal device by using an isolation component such as the transformer of the power supply. In this way, when energy of the surge voltage discharged at a terminal device side is lower than a suppression capability of the isolation component of the power supply, the power supply can withstand the surge voltage. However, when the energy of the surge voltage discharged at the terminal device side is higher than the suppression capability of the isolation component of the power supply, the isolation component of the power supply cannot withstand the surge voltage of such high energy and is broken down. As a result, the power supply is damaged.

SUMMARY

Embodiments of the present invention provide a surge protection circuit, a switching power supply, and a surge protection method, which can prevent a power supply from being damaged by a high energy surge voltage discharged from a terminal device side to an output end of the power supply.

To achieve the foregoing objective, the embodiments of the present invention adopt the following technical solutions.

A surge protection circuit is applied to a switching power supply, where an output end of the power supply is connected to a terminal device, and the power supply includes a transformer, where a ground wire end at a high voltage side of the transformer is grounded, and a ground wire end at a low voltage side of the transformer is not grounded; the circuit includes a surge protection tube, where one end of the surge protection tube is electrically connected to the ground wire end at the high voltage side of the transformer, and the other end of the surge protection tube is electrically connected to the ground wire end at the low voltage side of the transformer, where the ground wire end at the low voltage side of the transformer is electrically connected to a ground wire end of the terminal device; and the ground wire end at the high voltage side of the transformer, the surge protection tube, and the ground wire end at the low voltage side of the transformer form a loop, so that when a surge voltage on the terminal device is greater than a discharge voltage of the surge protection tube, the surge protection tube is conducted, and the surge protection tube discharges the surge voltage on the terminal device to the ground wire end at the high voltage side of the transformer.

A switching power supply includes the surge protection circuit.

A surge protection method is applied to the switching power supply, where the ground wire end at the low voltage side of the transformer receives the surge voltage discharged by the terminal device; and when the surge voltage discharged by the terminal device to the ground wire end at the low voltage side of the transformer is greater than the discharge voltage of the surge protection tube, the surge protection tube is conducted and discharges the surge voltage to the ground wire end at the high voltage side of the transformer through the loop formed by the ground wire end at the high voltage side of the transformer, the surge protection tube, and the ground wire end at the low voltage side of the transformer.

The embodiments of the present invention provide a surge protection circuit, a switching power supply, and a surge protection method, where the surge protection circuit includes a surge protection tube, the surge protection circuit is applied to the switching power supply, and an output end of the power supply is connected to a terminal device. The power supply includes a transformer, where a ground wire end at a high voltage side of the transformer is grounded, and a ground wire end at a low voltage side of the transformer is not grounded. The circuit includes a surge protection tube, where one end of the surge protection tube is electrically connected to the ground wire end at the high voltage side of the transformer, and the other end of the surge protection tube is electrically connected to the ground wire end at the low voltage side of the transformer. The ground wire end at the low voltage side is electrically connected to a ground wire end of the terminal device. The ground wire end at the high voltage side of the transformer, the surge protection tube, and the ground wire end at the low voltage side of the transformer form a loop. In this way, when there is a surge voltage on the terminal device, an isolation and protection component of the terminal device discharges the surge voltage to a ground wire of the output end of the power supply, that is, the ground wire end at the low voltage side of the transformer. When the surge voltage is smaller than a discharge voltage of the surge protection tube, the surge protection tube is disconnected, and the surge voltage is discharged to the ground wire end at the high voltage side of the transformer through an isolation component of the power supply such as the transformer, or a Y capacitor bridged between the high voltage side and the low voltage side of the transformer. When the surge voltage is greater than the discharge voltage of the surge protection tube, the surge protection tube is conducted and discharges, through a loop formed by the ground wire end at the high voltage side of the transformer, the surge protection tube, and the ground wire end at the low voltage side of the transformer, the surge voltage on the terminal device to the ground wire end at the high voltage side of the transformer, that is, discharges the surge voltage on the terminal device to the ground, thereby preventing the surge voltage from damaging the switching power supply.

BRIEF DESCRIPTION OF THE DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
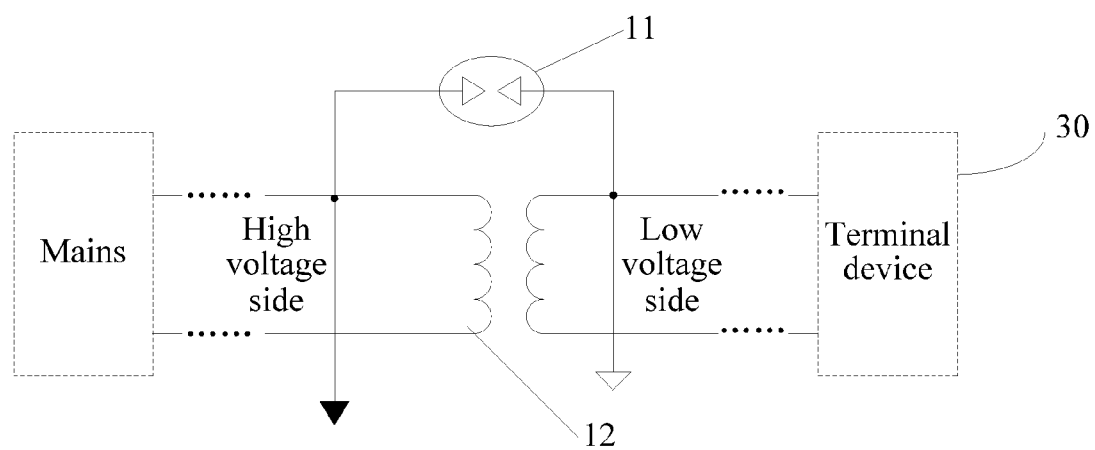
FIG. 1 is a schematic diagram of a surge protection circuit according to an embodiment of the present invention.
Figure 2:
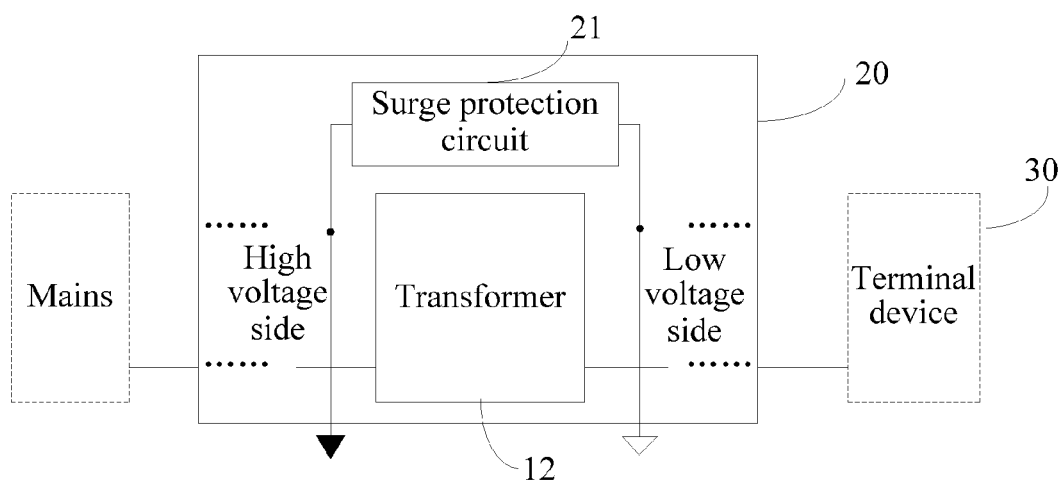
FIG. 2 is a simplified schematic structural diagram of a switching power supply according to an embodiment of the present invention.

An embodiment of the present invention provides a surge protection circuit 21. As shown in FIG. 1 and FIG. 2, the circuit may be applied to a switching power supply, and the switching power supply is a power supply that controls a ratio of turn-on time to turn-off time of a switching tube by using a modern power electronics technology so as to maintain a stable output voltage. An output end of the switching power supply 20 is connected to a terminal device 30, where the switching power supply 20 includes a transformer 12. As shown in FIG. 1 and FIG. 2, a solid triangle symbol represents that a ground wire end at a high voltage side of the transformer 12 is grounded, and a ground wire end at a low voltage side of the transformer 12 is not grounded. As shown in FIG. 1 and FIG. 2, a hollow triangle symbol represents that the ground wire end at the low voltage side of the transformer 12 is in a suspended state. The surge protection circuit 21 includes a surge protection tube 11, where one end of the surge protection tube 11 is electrically connected to the ground wire end at the high voltage side of the transformer 12, the other end of the surge protection tube 11 is electrically connected to the ground wire end at the low voltage side of the transformer 12, and the ground wire end at the low voltage side of the transformer 12 is electrically connected to a ground wire end of the terminal device 30; and the ground wire end at the high voltage side of the transformer 12, the surge protection tube 11, and the ground wire end at the low voltage side of the transformer 12 form a loop, that is, the surge protection circuit 21. In this way, when a surge voltage is generated on the terminal device 30, the surge voltage on the terminal device 30 is discharged to a ground wire of an output end of the switching power supply 20, that is, the ground wire end at the low voltage side of the transformer 12, through a protection component of the terminal device 30, such as a transient voltage suppressor (TVS) tube.

The surge protection tube 11 may specifically be a gas discharge tube. When the terminal device 30 is operating normally, or when a surge voltage discharged by a terminal device side to the ground wire end at the low voltage side of the transformer 12 is smaller than a discharge voltage of the surge protection tube 11, the surge protection tube 11 is in a disconnected state. In this way, the surge voltage that is smaller than the discharge voltage of the surge protection tube 11 may be discharged to the ground through an isolation component of the power supply 20, where the isolation component of the switching power supply 20 may be the transformer 12 or a Y capacitor. When the surge voltage discharged from the terminal device 30 to the ground wire end at the low voltage side of the transformer 12 is greater than the discharge voltage of the surge protection tube 11, the surge protection tube 11 is conducted, and through the loop formed by the ground wire end at the high voltage side of the transformer 12, the surge protection tube 11, and the ground wire end at the low voltage side of the transformer 12, the surge protection tube 11 discharges the surge voltage in the loop to the ground wire end at the high voltage side of the transformer 12, that is, discharges the surge voltage to the ground because the ground wire end at the high voltage side of the transformer 12 is grounded, thereby preventing the power supply from being damaged when there is a high energy surge voltage on the terminal device 30.

Further, the discharge voltage of the surge protection tube 11 may specifically be greater than 3000 volts (V), or the discharge voltage of the surge protection tube 11 may be determined according to an isolation voltage of the isolation component of the switching power supply, such as an isolation voltage of the transformer, the Y capacitor, or a photo coupler. Preferably, the discharge voltage of the surge protection tube 11 may be 4000 V.

For example, it is generally required that an isolation component between a high voltage side and a low voltage side of a transformer of a switching power supply can suppress a surge voltage of smaller than 3000 V, and therefore, in order to effectively prevent the surge voltage at the side of the terminal device 30 from damaging the switching power supply 20, the discharge voltage of the surge protection tube 11 may be greater than 3000 V. In general, an isolation component to be disposed between a high voltage side and a low voltage side of the transformer 12 is designed with a margin in isolation voltage, that is, the isolation voltage may be greater than 3000 V. Therefore, preferably, the discharge voltage of the surge protection tube 11 may be 4000 V. In this way, in a case that the isolation component can still suppress the surge voltage, it is prevented that the surge protection tube 11 discharges the surge voltage to the ground after the surge protection tube 11 is conducted.

Further, the circuit may further include a first isolation component, where in the loop formed by the ground wire end at the high voltage side of the transformer 12, the surge protection tube 11, and the ground wire end at the low voltage side of the transformer 12, the first isolation component is connected in parallel with the surge protection tube 11.

Further, the first isolation component may specifically be a Y capacitor.

The first isolation component may be configured to eliminate interference between the ground wire end at the high voltage side and the ground wire end at the low voltage side of the transformer 12.

Further, as shown in FIG. 2, an embodiment of the present invention further provides a switching power supply 20, where the switching power supply 20 includes the surge protection circuit 21 and the transformer 12 provided by the foregoing embodiment.

Definitely, the switching power supply 20 may further include a first surge protection circuit, which is one or more of a surge protection circuit configured to prevent a surge voltage being generated when the switching power supply 20 is connected to the mains, a rectifier circuit, a filter circuit, and a voltage stabilizing circuit.

Because the rectifier, filter, and voltage stabilizing circuits are of the prior art in the field of electronic technologies, they are not described repeatedly in this embodiment.

Here, the first surge protection circuit is configured to prevent a surge voltage at the position where the mains is connected from damaging the switching power supply 20. The first surge protection circuit may use a surge protection tube or another isolation component, which is not limited in this embodiment.

Figure 3:
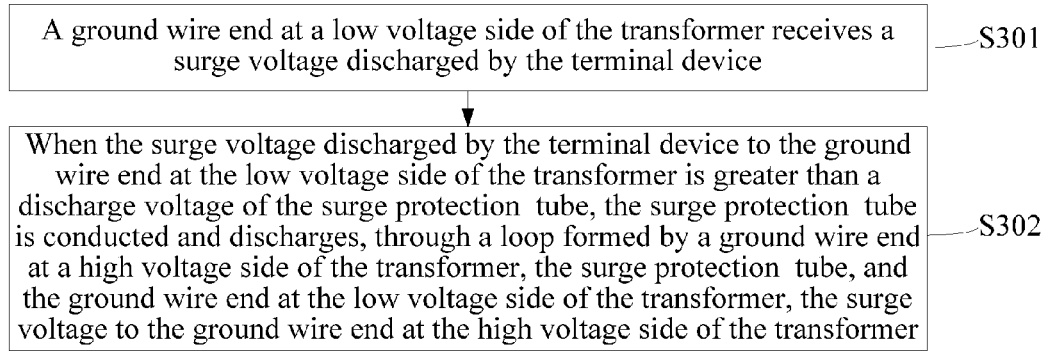
FIG. 3 is a schematic flowchart of a surge protection method according to an embodiment of the present invention.

Further, an embodiment of the present invention further provides a surge protection method applied to the switching power supply 20 (referring to FIG. 2), as shown in FIG. 3, including:

S301: The ground wire end at the low voltage side of the transformer 12 receives a surge voltage discharged by the terminal device 30.

The terminal device 30 has a corresponding protection component, such as a TVS tube, and the terminal device 30 may discharge, through the protection component, the surge voltage to a ground wire end of an output end of the switching power supply 20, that is, the ground wire end at the low voltage side of the transformer 12.

S302: When the surge voltage discharged by the terminal device 30 to the ground wire end at the low voltage side of the transformer 12 is greater than the discharge voltage of the surge protection tube 11, the surge protection tube 11 is conducted and discharges, through the loop formed by the ground wire end at the high voltage side of the transformer 12, the surge protection tube 11 and the ground wire end at the low voltage side of the transformer 12, the surge voltage to the ground wire end at the high voltage side of the transformer 12, that is, discharges the surge voltage to the ground because the ground wire end at the high voltage side of the transformer 12 is grounded, thereby preventing the switching power supply 20 from being damaged when there is a high energy surge voltage on the terminal device 30.

Further, the discharge voltage of the surge protection tube 11 may specifically be greater than 3000 V, or the discharge voltage of the surge protection tube 11 may be determined according to the isolation voltage of the isolation component of the switching power supply 20, such as an isolation voltage of the transformer, the Y capacitor, or a photo coupler. Preferably, the discharge voltage of the surge protection tube 11 may be 4000 V.

For example, it is generally required that an isolation component between a high voltage side and a low voltage side of a transformer of a switching power supply can suppress a surge voltage of smaller than 3000 V, and therefore, in order to prevent the surge voltage at the side of the terminal device 30 from damaging the power supply, the discharge voltage of the surge protection tube 11 may be greater than 3000 V. In general, an isolation component between a high voltage side and a low voltage side of the transformer 12 is designed with a margin in isolation voltage, that is, the isolation voltage may be greater than 3000 V. Therefore, preferably, the discharge voltage of the surge protection tube may be 4000 V. In this way, in a case that the isolation component can still suppress the surge voltage, it is prevented that the surge protection tube discharges the surge voltage to the ground after the surge protection tube is conducted.

Embodiments of the present invention provide a surge protection circuit, a switching power supply, and a surge protection method, where the surge protection circuit includes a surge protection tube, the surge protection circuit is applied to the switching power supply, and an output end of the power supply is connected to a terminal device. The power supply includes a transformer, where a ground wire end at a high voltage side of the transformer is grounded, and a ground wire end at a low voltage side of the transformer is not grounded. The circuit includes a surge protection tube, where one end of the surge protection tube is electrically connected to the ground wire end at the high voltage side of the transformer, and the other end of the surge protection tube is electrically connected to the ground wire end at the low voltage side of the transformer. The ground wire end at the low voltage side is electrically connected to a ground wire end of the terminal device. The ground wire end at the high voltage side of the transformer, the surge protection tube, and the ground wire end at the low voltage side of the transformer form a loop. In this way, when there is a surge voltage on the terminal device, an isolation and protection component in the terminal device discharges the surge voltage to a ground wire of an output end of the power supply, that is, the ground wire end at the low voltage side of the transformer. When the surge voltage is smaller than a discharge voltage of the surge protection tube, the surge protection tube is disconnected, and the surge voltage is discharged to the ground wire end at the high voltage side of the transformer through an isolation component of the power supply such as a transformer, or a Y capacitor bridged between a high voltage side and a low voltage side of the transformer. When the surge voltage is greater than the discharge voltage of the surge protection tube, the surge protection tube is conducted and discharges, through a loop formed by the ground wire end at the high voltage side of the transformer, the surge protection tube, and the ground wire end at the low voltage side of the transformer, the surge voltage on the terminal device to the ground wire end at the high voltage side of the transformer, that is, discharges the surge voltage on the terminal device to the ground, thereby preventing the surge voltage from damaging the switching power supply.

A person of ordinary skill in the art may understand that all or a part of the steps of the foregoing method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, an optical disc, or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A surge protection circuit, applied to a switching power supply, wherein an output end of the power supply is connected to a terminal device, and the power supply comprises a transformer, a ground wire end at a high voltage side of the transformer is grounded, and a ground wire end at a low voltage side of the transformer is not grounded, the surge protection circuit comprising:
   a surge protection tube,
   wherein one end of the surge protection tube is electrically connected to the ground wire end at the high voltage side of the transformer, the other end of the surge protection tube is electrically connected to the ground wire end at the low voltage side of the transformer, and the ground wire end at the low voltage side of the transformer is electrically connected to a ground wire end of the terminal device, and
   wherein the ground wire end at the high voltage side of the transformer, the surge protection tube, and the ground wire end at the low voltage side of the transformer form a loop such that when a surge voltage on the terminal device is greater than a discharge voltage of the surge protection tube, the surge protection tube is conducted, and the surge protection tube discharges the surge voltage on the terminal device to the ground wire end at the high voltage side of the transformer.

2. The circuit according to claim 1, wherein the discharge voltage of the surge protection tube is greater than 3000 volts (V).

3. The circuit according to claim 2, wherein an isolation component is further connected in parallel with the surge protection tube in the loop formed by the ground wire end at the high voltage side of the transformer, the surge protection tube, and the ground wire end at the low voltage side of the transformer.

4. The circuit according to claim 3, wherein the isolation component comprises a Y capacitor.

5. A switching power supply, comprising:
   a surge protection circuit,
   wherein an output end of the power supply is connected to a terminal device, and the power supply comprises a transformer, a ground wire end at a high voltage side of the transformer is grounded, and a ground wire end at a low voltage side of the transformer is not grounded,
   wherein the surge protection circuit comprises a surge protection tube, one end of the surge protection tube is electrically connected to the ground wire end at the high voltage side of the transformer, the other end of the surge protection tube is electrically connected to the ground wire end at the low voltage side of the transformer, and the ground wire end at the low voltage side of the transformer is electrically connected to a ground wire end of the terminal device, and
   wherein the ground wire end at the high voltage side of the transformer, the surge protection tube, and the ground wire end at the low voltage side of the transformer form a loop such that when a surge voltage on the terminal device is greater than a discharge voltage of the surge protection tube, the surge protection tube is conducted, and the surge protection tube discharges the surge voltage on the terminal device to the ground wire end at the high voltage side of the transformer.

6. The switching power supply according to claim 5, wherein the discharge voltage of the surge protection tube is greater than 3000 volts (V).

7. The switching power supply according to claim 6, wherein an isolation component is further connected in parallel with the surge protection tube in the loop formed by the ground wire end at the high voltage side of the transformer, the surge protection tube, and the ground wire end at the low voltage side of the transformer.

8. The switching power supply according to claim 7, wherein the isolation component comprises a Y capacitor.

9. A surge protection method applied to a switching power supply, comprising:
   receiving, by a ground wire end at a low voltage side of a transformer, a surge voltage discharged by a terminal device; and
   when the surge voltage discharged by the terminal device to the ground wire end at the low voltage side of the transformer is greater than a discharge voltage of a surge protection tube, conducting the surge protection tube, and discharging the surge voltage to the ground wire end at a high voltage side of the transformer through a loop formed by the ground wire end at the high voltage side of the transformer, the surge protection tube, and the ground wire end at the low voltage side of the transformer.

10. The surge protection method according to claim 9, wherein the switching power supply comprises:
    a surge protection circuit,
    wherein an output end of the power supply is connected to the terminal device, and the power supply comprises the transformer, the ground wire end at the high voltage side of the transformer is grounded, and the ground wire end at the low voltage side of the transformer is not grounded,
    wherein the surge protection circuit comprises the surge protection tube, one end of the surge protection tube is electrically connected to the ground wire end at the high voltage side of the transformer, the other end of the surge protection tube is electrically connected to the ground wire end at the low voltage side of the transformer, and the ground wire end at the low voltage side of the transformer is electrically connected to a ground wire end of the terminal device, and
    wherein the ground wire end at the high voltage side of the transformer, the surge protection tube, and the ground wire end at the low voltage side of the transformer form the loop such that when the surge voltage on the terminal device is greater than the discharge voltage of the surge protection tube, the surge protection tube is conducted, and the surge protection tube discharges the surge voltage on the terminal device to the ground wire end at the high voltage side of the transformer.

* * * * *